US012390804B2

(12) United States Patent
Pheng et al.

(10) Patent No.: US 12,390,804 B2
(45) Date of Patent: Aug. 19, 2025

(54) MODIFIED DROPPER DEVICE AND METHOD FOR ACCURATE DOSING

(71) Applicant: Control Ltd., Lebanon, PA (US)

(72) Inventors: Sereyviseth Pheng, Lebanon, PA (US); Sophornarak Horn, Lebanon, PA (US)

(73) Assignee: Control Ltd., Lebanon, PA (US)

( * ) Notice: Subject to any disclaimer, the term of this patent is extended or adjusted under 35 U.S.C. 154(b) by 688 days.

(21) Appl. No.: 17/836,567

(22) Filed: Jun. 9, 2022

(65) Prior Publication Data

US 2022/0395824 A1 Dec. 15, 2022

Related U.S. Application Data

(60) Provisional application No. 63/209,978, filed on Jun. 12, 2021.

(51) Int. Cl.
*B01L 3/02* (2006.01)

(52) U.S. Cl.
CPC ........... *B01L 3/0217* (2013.01); *B01L 3/0293* (2013.01); *B01L 2200/0605* (2013.01); *B01L 2200/0689* (2013.01); *B01L 2300/042* (2013.01)

(58) Field of Classification Search
CPC ................. B01L 3/0217; B01L 3/0293; B01L 2200/0605; B01L 2200/0689; B01L 2300/042; B01L 2200/141; B01L 2200/143; B01L 2400/0478; A61J 1/065
See application file for complete search history.

(56) References Cited

U.S. PATENT DOCUMENTS

| | | | | |
|---|---|---|---|---|
| 3,613,952 | A | 10/1971 | Gilmont et al. | |
| 3,918,308 | A | 11/1975 | Reed | |
| 4,141,251 | A | 2/1979 | Oshikubo | |
| 4,261,205 | A | 4/1981 | Oshikubo et al. | |
| 4,266,481 | A | 5/1981 | Garrett et al. | |
| 4,284,604 | A | 8/1981 | Tervamaki | |
| 6,428,750 | B1 * | 8/2002 | Rainin | B01L 3/0224 73/864.18 |
| 2009/0283547 | A1 * | 11/2009 | Harrold | B05B 11/1092 222/256 |
| 2015/0075520 | A1 * | 3/2015 | Kakuta | A61M 15/009 128/200.14 |
| 2015/0101705 | A1 * | 4/2015 | Kim | A45D 34/04 141/23 |

* cited by examiner

*Primary Examiner* — Jennifer Wecker
*Assistant Examiner* — Britney N. Washington
(74) *Attorney, Agent, or Firm* — Hilary J. Sumner

(57) ABSTRACT

A method and apparatus for controlling and visually, audibly, and tactilely communicating the administration of discrete unit doses of material dispensed from a dropper through use of a modified plunger having a geometric profile corresponding to a unit dose. This profile engages with the dropper interior in a manner that creates audio, visual, and tactile cues as each unit dose is administered. The profile may take the form of peaks and valleys or teeth. Alternatively, the plunger profile may be threaded and may include a channel along the plunger's longitudinal axis.

19 Claims, 16 Drawing Sheets

DETAIL V

DETAIL E

DETAIL J

DETAIL P

DETAIL R

DETAIL R

MODIFIED DROPPER DEVICE AND METHOD FOR ACCURATE DOSING

CROSS REFERENCE TO RELATED APPLICATIONS

This application claims benefit of priority from U.S. Provisional Patent Application No. 63/209,278 of Sereyviseth Pheng and Sophornarak Horn filed Jul. 12, 2021, entitled MODIFIED DROPPER DEVICE AND METHOD FOR ACCURATE DOSING the entirety of which is incorporated herein by reference.

STATEMENT REGARDING FEDERALLY SPONSORED RESEARCH/DEVELOPMENT

Not Applicable

PARTIES TO A JOINT RESEARCH AGREEMENT

Not Applicable

REFERENCE TO SEQUENCE LISTING, TABLE OR COMPUTER PROGRAM

Not Applicable

BACKGROUND OF THE INVENTION

The present invention is directed to a method and apparatus for accurate dosing of liquids. While the device relates more particularly to oral dosing of tinctures, the invention is designed to replace a standard dropper or Pasteur pipette and may be used to dispense specific quantities of any liquid.

Eye droppers or Pasteur pipettes are devices commonly used to withdraw liquid from a vial or container while minimizing exposure of that liquid to the external environment. The dropper device is generally comprised of a glass or plastic tube or barrel that tapers to a narrowed opening on one end while the opposing end is fitted with a malleable bulb. This bulb is squeezed to create a vacuum within the pipette prior to its insertion into the liquid. When the bulb is released, the pressure differential between the interior of the pipette and the liquid within the container creates suction thereby drawing liquid into the pipette. The user may add or remove material from the pipette by squeezing the malleable bulb.

The problem with these devices is that they do not provide accurate dosing of the desired liquid. A standard dropper or Pasteur pipette often includes graduations on the barrel to estimate the volume of liquid withdrawn; however, these graduations are not particularly precise and visualization of the fluid meniscus complicates the measurement. Furthermore, one must withdraw a quantity of fluid and remove the pipette from the vial to visualize the graduations. If an excess of liquid has been withdrawn, the bulb must be compressed to return the additional material to the vial. This practice may introduce contaminants if the user has touched the tip or exterior surface of the pipette to another surface while inspecting the volume within the barrel.

If an insufficient amount of liquid has been withdrawn into the dropper, the likelihood of contamination is even greater as the user repeatedly inserts and withdraws the barrel from the liquid in an attempt to extract the appropriate dose. These subsequent squeezes may additionally introduce air bubbles within the tube, making it difficult to properly gauge the quantity of fluid within the pipette.

Inaccurate dosing can pose a serious health danger when an exact quantity of medication is required. Patients who are self-administering prescriptions may find it challenging to accurately measure their medications using standard droppers based on the reasoning described above. Tinctures often come in varying potencies and the strength of the drug may vary greatly depending on the mode of manufacture or other variables. Improper dosing becomes even more of a concern if that individual is operating with compromised motor skills or vision.

Those suffering from illnesses such as Parkinson's disease, multiple sclerosis, glaucoma, fibromyalgia, as well as chronic inflammation and pain disorders frequently have weakened eyesight, diminished hand strength, and poor motor control. Consequently, self-administration of medications through a dropper is often difficult and dangerous when one considers the possibility of accidental overdose.

There is therefore a need in the art for an apparatus that provides a safe, simple, and effective means for administering accurate quantities of medications or other liquids through a dropper.

BRIEF SUMMARY OF THE INVENTION

Tinctures and other liquid medications are typically administered through standard eye droppers or Pasteur pipettes inserted into a liquid containment vessel (hereinafter a "vial"). The user relies on graduations printed or molded on the surface of the pipette barrel or alternatively, the user counts the number of drops exiting the tip of the pipette. The graduations are not designed for accuracy and offer only very basic volumetric reference points. Drop sizes may vary in volume depending on the force exerted on the dropper bulb and the user may lose track of the number of drops administered. Consequently, neither the graduations nor the drop counting method offer an accurate means of dosing. The present invention seeks to provide a device and method for the accurate administration of material within a vial using a modified dropper.

The modified dropper described herein, allows the user to focus on proper volumetric dosing and improves safety by offering audio, visual, and tactile cues as each dose is dispensed. This is of particular importance when one possessing diminished sensory or motor skills is administering liquid doses from a dropper. While inventors anticipate the use of this method and device for dispensing medications, one will appreciate that it may also be used for delivering epoxies, adhesives, and other liquids that require the application of a specific volume.

The present invention replaces a standard dropper with a modified dropper assembly having a plunger inserted into a hollow tube. This modified dropper assembly may work as a standalone device or it may be affixed to a vial containing the desired material. The plunger incorporates specific features on its geometric profile that engage with corresponding geometric features on an engagement mechanism within the dropper assembly. The profile contours on the plunger correspond to a desired dose of material, hereinafter referred to as a "unit dose".

To extract liquid from the vial, the plunger is depressed fully into the hollow tube. The hollow tube of modified dropper assembly is submerged in a desired liquid which may be held by any container. For the purpose of this application the desired liquid shall be held within an optional vial. The cap of the modified dropper assembly may be placed loosely on the vial or it may be screwed or press fit onto the vial for a more secure and watertight fit.

Once the modified dropper assembly is within the container, the tip of the tube must be fully immersed in the liquid. To extract the liquid, the user retracts the plunger partially withdrawing it from the tube. The user may disengage the engagement mechanism from the plunger using an optional disengagement mechanism to allow free movement of the plunger within the tube or the plunger geometry may be configured to allow retraction of the plunger within the engagement mechanism without having to disengage these mating profiles. As the user withdraws the plunger, the resulting vacuum within the tube draws liquid into the hollow tube.

To dispense the liquid, the user positions the dispensing end of the tube in, on, or near the desired administration site. The plunger is depressed and liquid exits the end of the tube. As the plunger is depressed, the profile features on the plunger mate with the engagement mechanism within the dropper cap. A distinct noise and vibration is generated with each administered unit dose as the features of the plunger and engagement mechanism engage with one another. The dropper cap shall also be referred to as a stabilizing unit as this component need not necessarily function as a cap.

The plunger and engagement mechanism work in concert to control the motion and rate of advancement of the plunger, thereby providing more uniform and controlled dispensing of the material exiting the tip of the tube. Regulation of the plunger motion and its advancement can be achieved through the use of threads on both the engagement mechanism and plunger, by corresponding positive and negative contours on these two components, or through a combination of these elements. The threads and contours within the plunger profile and engagement mechanism are designed to create audible and tactile feedback to the user as each unit dose is dispensed from the tip of the tube.

Contours on the plunger may take the form of cavities, channels, or protrusions to create "interlocking elements". The engagement mechanism is comprised of a complimentary geometric profile or feature (hereinafter "receiving element") that facilitates recurrent engagement with the interlocking element as the plunger advances within the dropper cap and tube. The receiving element may take the form of a deformable component such as an elastic tab, spring loaded element, or similar mechanical device as described more fully below.

As the plunger advances within the engagement mechanism, the receiving element yields in a manner that allows it to store mechanical energy. An audible clicking sound and accompanying vibration emanates from the modified dropper assembly as the receiving element engages with the interlocking element. Sound and tactile cues are generated as the potential energy is rapidly converted into noise and vibration when the receiving element snaps into the interlocking element. The geometry, material properties, or spring-loaded nature of the receiving element allow the engagement mechanism to disengage from the interlocking element as the plunger end is depressed or rotated (depending on the type of profile used), causing the plunger to advance the next unit dose. The audio, visual, and tactile feedback provided with the advancement of the plunger allows the user to see, hear, and feel the number of unit doses or drops that they have administered.

In one embodiment, the auditory and tactile cues are provided through a toothed plunger having a series of peaks and flat segments or valleys. The distance between the flat sections or valleys on the plunger defines the unit dose and can therefore be designed to suit the potency of the medication being administered. As the user applies pressure to the end of the plunger, the peaks on the plunger profile force the receiving element within the engagement mechanism to deform and store potential energy. As previously noted, this energy is released as a noise and vibration when the receiving element reaches an interlocking element on the plunger profile. An optional dosing key may be affixed to the interlocking elements within the plunger profile to limit the plunger's travel distance within the tube. Labeled or color coded keys may also be used to track dosing schedules and minimize the potential for inadvertent overdose.

In another embodiment, a threaded plunger having one or more channels mates with a spring loaded pin within the engagement mechanism. The plunger emits a noise and vibration as the energy stored within the spring propels the pin into the channel as the plunger rotates into place with each administered unit dose. The channel or channels are positioned along the longitudinal axis of the plunger. This embodiment is ideally suited for those requiring micro doses of a liquid within the vial. As previously noted, one or more channels may be positioned along the longitudinal axis of the plunger depending on the desired dose.

REFERENCE NUMERAL LISTING

Figure 1A:
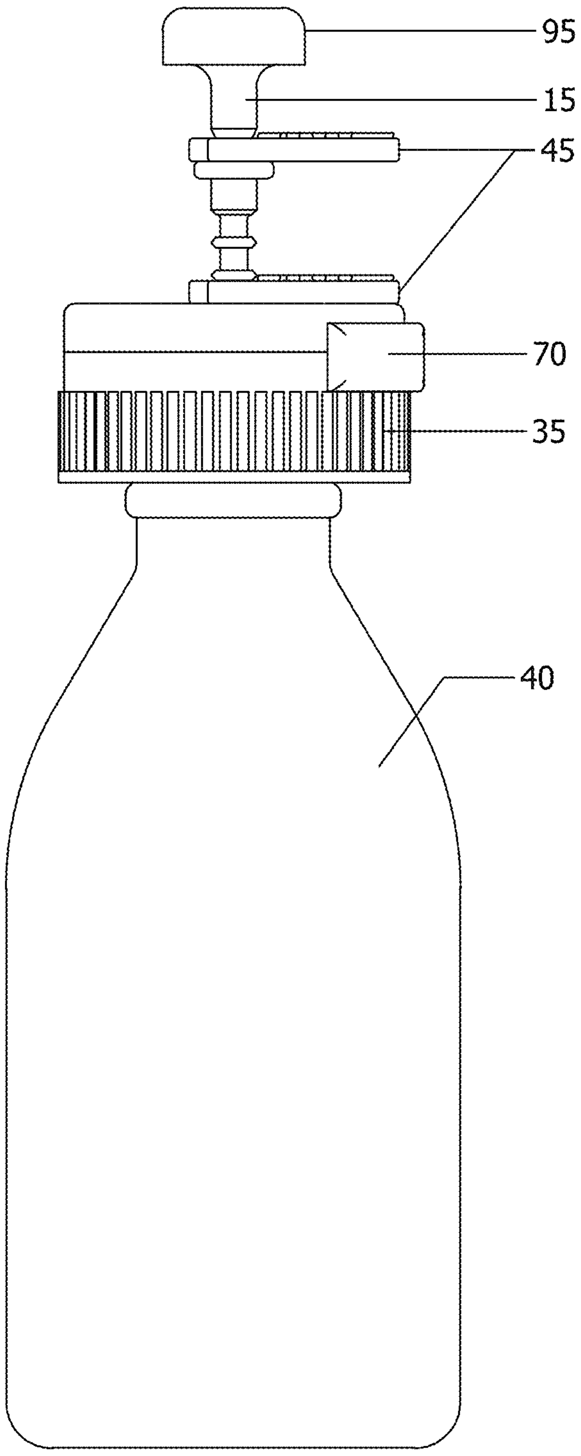
FIG. 1A is an elevational side view of the modified dropper assembly secured to an optional vial and having two optional dose limiting keys.

5 Modified Dropper Assembly
10 Hollow Tube
15 Plunger
18 Liquid
20 Interlocking Element
22 Through-hole
25 Engagement Mechanism
30 Receiving Element
35 Dropper Cap/Stabilizing Unit
38 Dropper Cap Threads
40 Vial
42 Vial Threads
45 Dosing Key
50 Plunger Profile Geometry
55 Tip of Tube
60 Vial Base
65 Funnel Cavity
70 Disengagement mechanism
75 Spring
80 Tip of Plunger
85 O-Ring
88 Rubber Tip
90 Projecting Element/Pin/Collar
95 Knob
105 Dropper Cap Cover
110 Gasket
L-L Longitudinal Axis of Plunger

DETAILED DESCRIPTION OF THE INVENTION

Specific terms are used for the sake of clarity in describing the embodiments below. The invention is not intended to be limited to the selected terminology and it should be understood that each specific element includes all technical equivalents operating in a similar manner to accomplish a similar function.

In this patent application, materials dispensed by the modified dropper device, including those with extremely high viscosities such as oils, syrups, polymers, adhesives, and similar substances, shall be referred to as a "liquid," "fluid," or "material." For the purposes of this application a "unit dose" shall be defined as the amount of a medication administered to a patient in a single dose or drop. The "dropper cap" may be referred to alternatively as a "stabilizing unit" if this component is used solely to steady the user's hand rather than function as a cap.

The device and method described herein seek to provide uniform drops of liquid as well as a multi-sensory experience with each administered unit dose. These additional features improve safety by offering multiple cues to the user as each drop is dispensed. This is accomplished through a set of components that intermittently mate within the device as described more fully below.

The present invention 5 is comprised of a tube 10, a plunger 15 sized to fit within the tube 10 and having a plunger profile geometry 50, an appropriately sized dropper cap (stabilizing unit) 35 that may be suited to fit an optional vial 40 of the desired liquid, an engagement mechanism 25 integral to or fitted within the dropper cap 35 and designed to engage with the plunger profile geometry 50, an optional disengagement mechanism 70, and one or more optional dose limiting keys 45. Please see FIGS. 1A-1D. The engagement mechanism 25 is comprised of a receiving element 30 that engages with one or more interlocking elements 20 on the plunger profile geometry 15.

The dropper cap 35 has a through-hole 22 which penetrates the thickness of the dropper cap 35. The engagement mechanism 25 abuts the perimeter of, sits within, or surrounds said through-hole 22. The engagement mechanism 25 may be placed within or, alternatively, may form an integral part of said dropper cap 35. Please see FIG. 3C. A hollow tube 10, having a connection end and a dispensing end, extends from the base of the dropper cap 35 such that the connection end is centered beneath and surrounds the through-hole 22 as shown in FIGS. 1B and 3C as described more fully below. Alternatively, the hollow tube 10 may fit within the through-hole 22 such that a watertight seal is formed. The dispensing end of the tube 10 ideally has a narrow, tapered tip 55 as shown in FIG. 1B to enhance the vacuum created when the plunger is withdrawn; however, the tip 55 may be of the same of smaller diameter as that of the remainder of the hollow tube 10. The tube 10 is ideally of sufficient length to allow the dispensing end of the tube 10 to rest at or near the base 60 of the liquid containment vessel or optional vial 40 when the dropper cap 35 is secured to this vessel 40. This ensures that the tip 55 of the tube 10 remains fully submerged in the desired material, thereby minimizing the introduction of air. The vial base 60 may be flat, concave (as depicted in FIG. 2A), or funnel-shaped (as depicted in FIG. 2B). The concave and funnel-shaped base configurations help to direct liquid to the tip of the tube 55 again minimizing the introduction of air. A vial such as that depicted in FIG. 2B, allows the tube 10 to fits within the funnel cavity 65. The sloped sides of the vial base direct liquid into this cavity 65, ensuring that the tip 55 of the tube 10 remains submerged even when the quantity of material within the vial 40 is reduced.

Figure 3A:
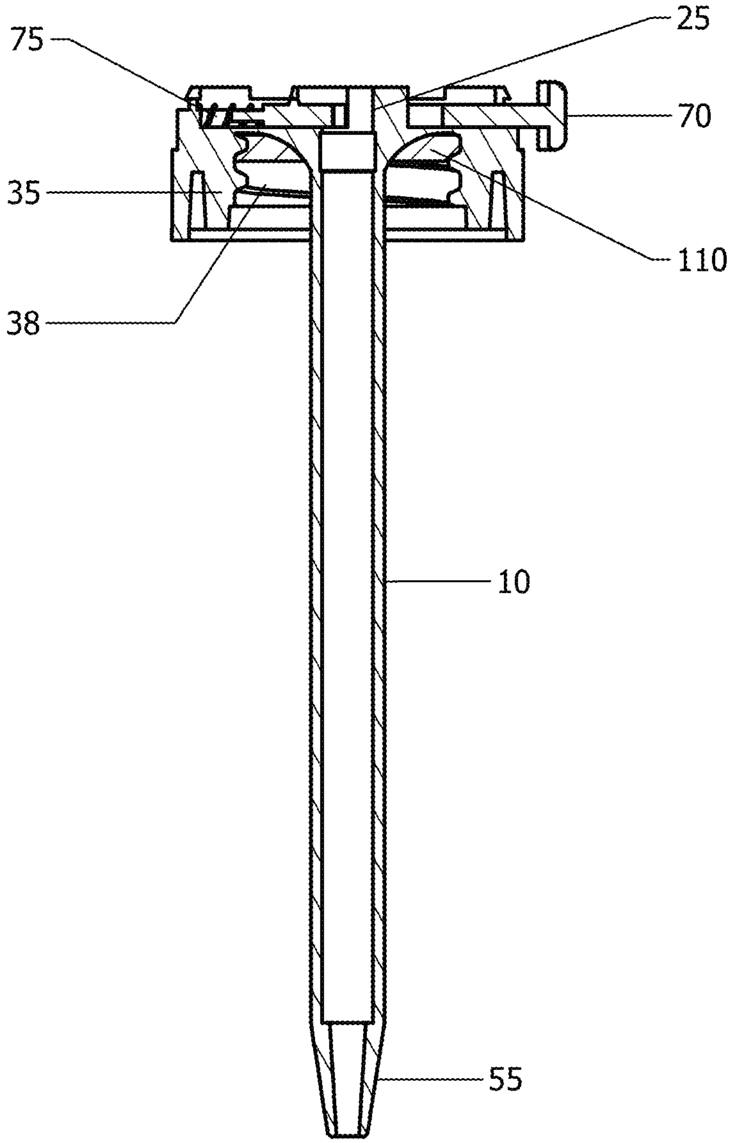
FIG. 3A is a cross-sectional view of a dropper cap (stabilizing unit) having an integral tube, illustrating the spring-loaded engagement mechanism in a fully closed position.
Figure 3B:
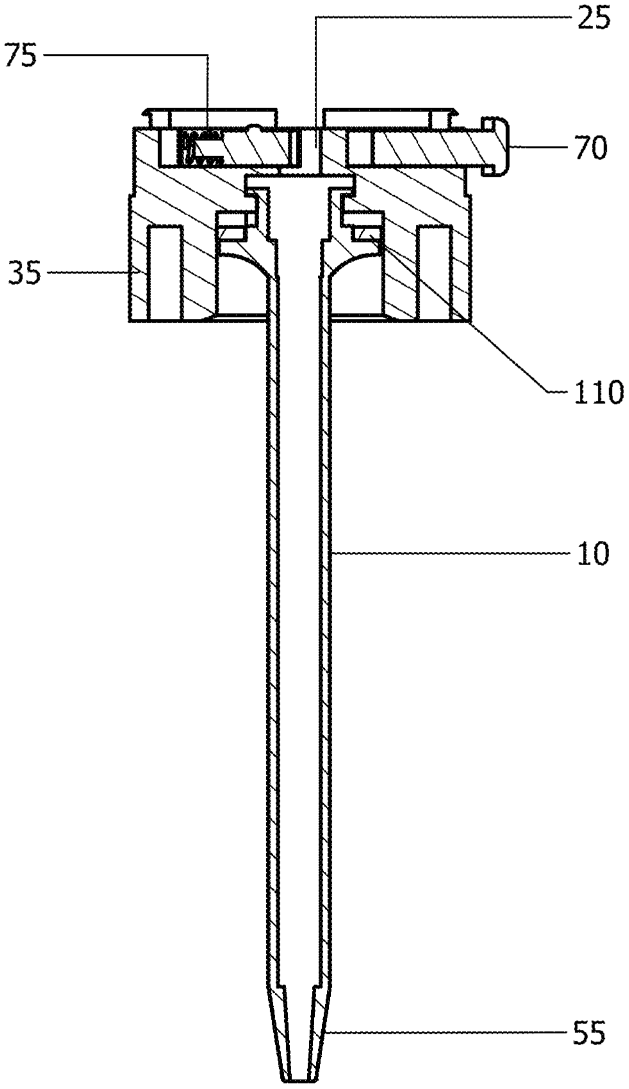
FIG. 3B is a cross-sectional view of the dropper cap (stabilizing unit) with connected tube, illustrating the spring-loaded engagement mechanism in a fully closed position.
Figure 3C:
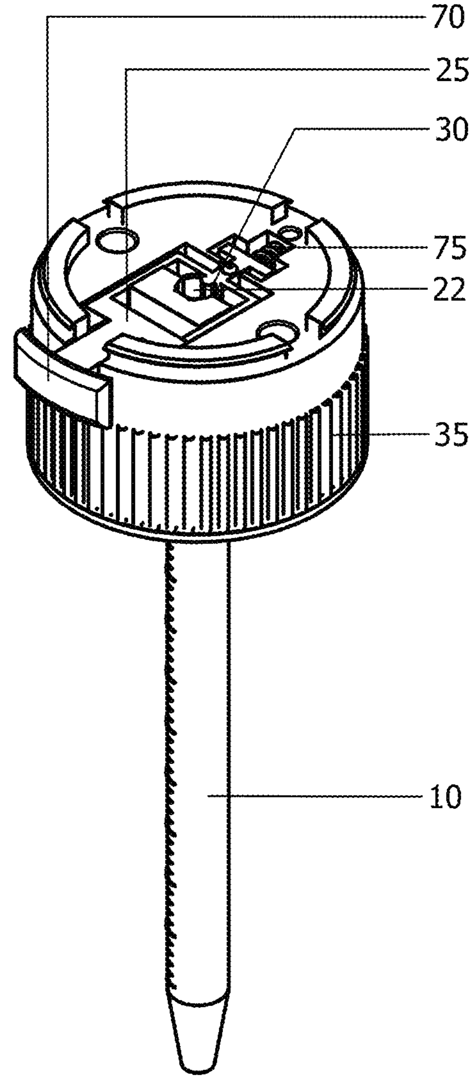
FIG. 3C is a perspective view of the dropper cap (stabilizing unit) and a graduated tube wherein the dropper cap is illustrated without the dropper cap cover.
Figure 3D:
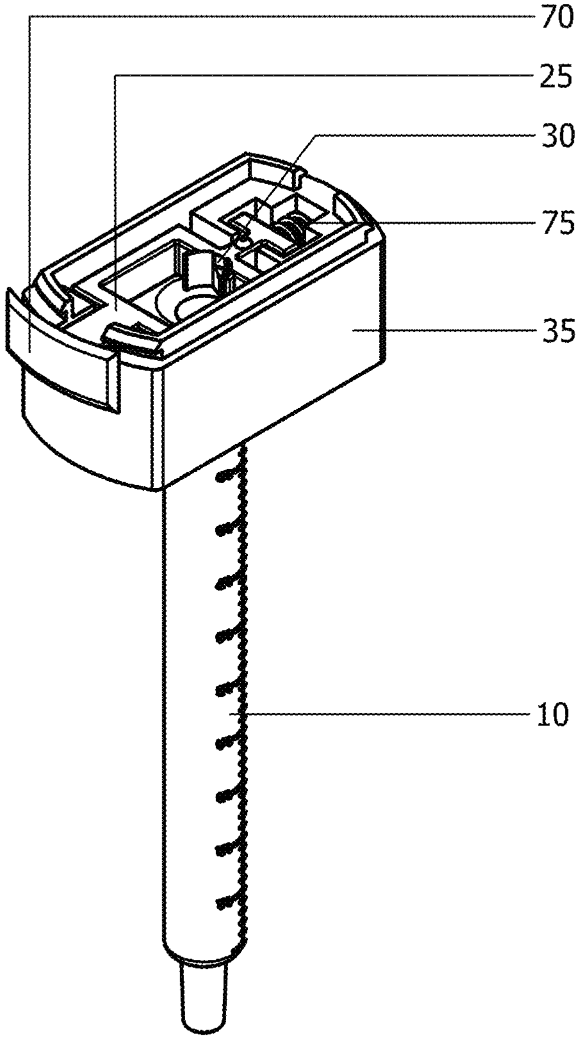
FIG. 3D is a perspective view of a non-cylindrical dropper cap (stabilizing unit) and a graduated tube wherein the dropper cap is illustrated without the dropper cap cover.
Figure 3E:
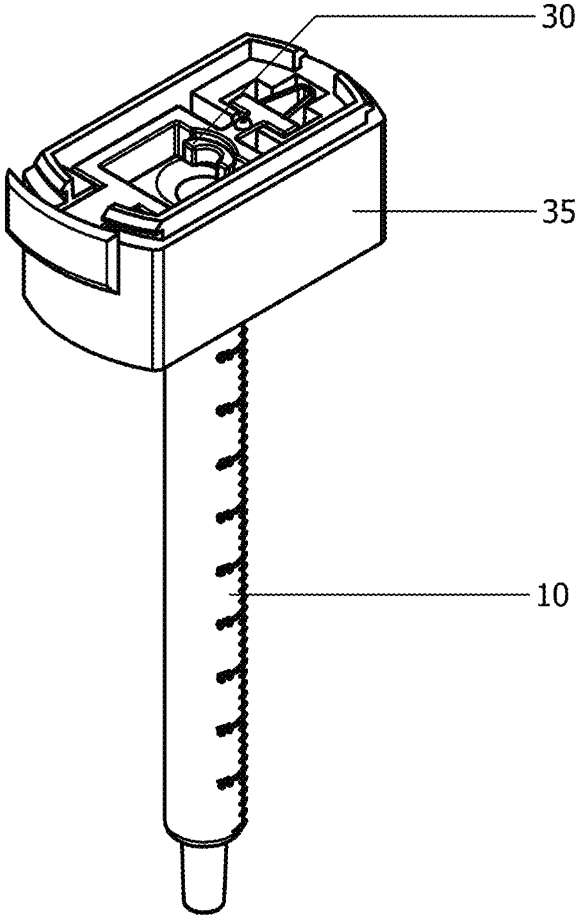
FIG. 3E is a perspective view of another embodiment of a dropper cap (stabilizing unit) and a graduated tube wherein the dropper cap is illustrated without the dropper cap cover and wherein the receiving element flexes to accommodate the plunger profile such as that illustrated in FIGS. 9A and 9B.

The hollow tube 10 may form an integral part of the dropper cap 35 as shown in FIG. 3A or it may be connected to the dropper cap 35 through a compression fit, mating threads, clamping mechanism, or similar connecting means as shown in FIG. 3B. It should be recognized that other mating geometries or fasteners may replace the proposed methods of attachment provided that the tube 10 is connected to the dropper cap 35 in a manner that results in a watertight seal between the dropper cap 35 and the interior of the tube 10 at the connection end. See FIG. 3B.

Figure 4A:
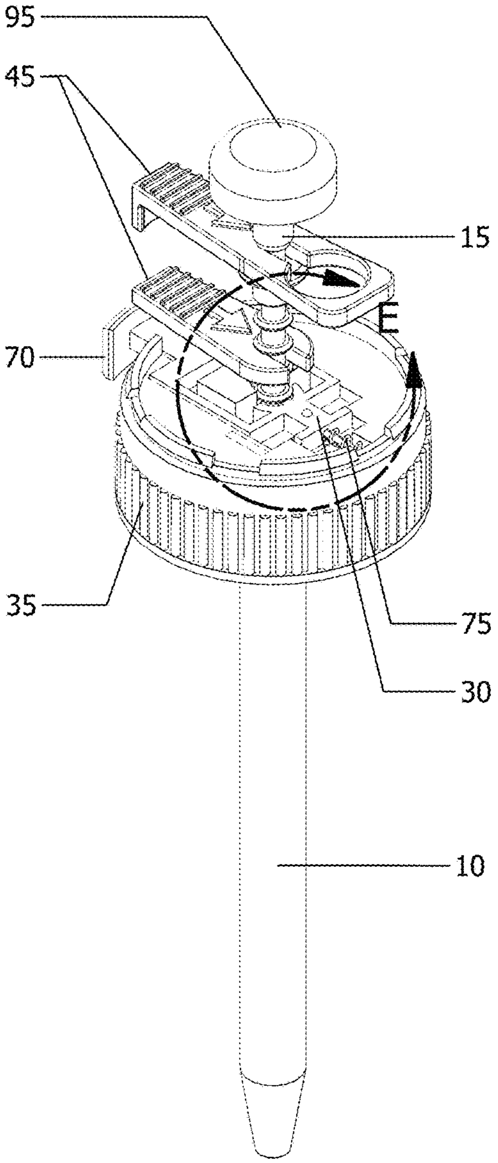
FIG. 4A is a perspective view of the modified dropper assembly having a series of plunger stops, a spring-loaded receiving element in the dropper cap, and two optional dose limiting keys.
Figure 4B:
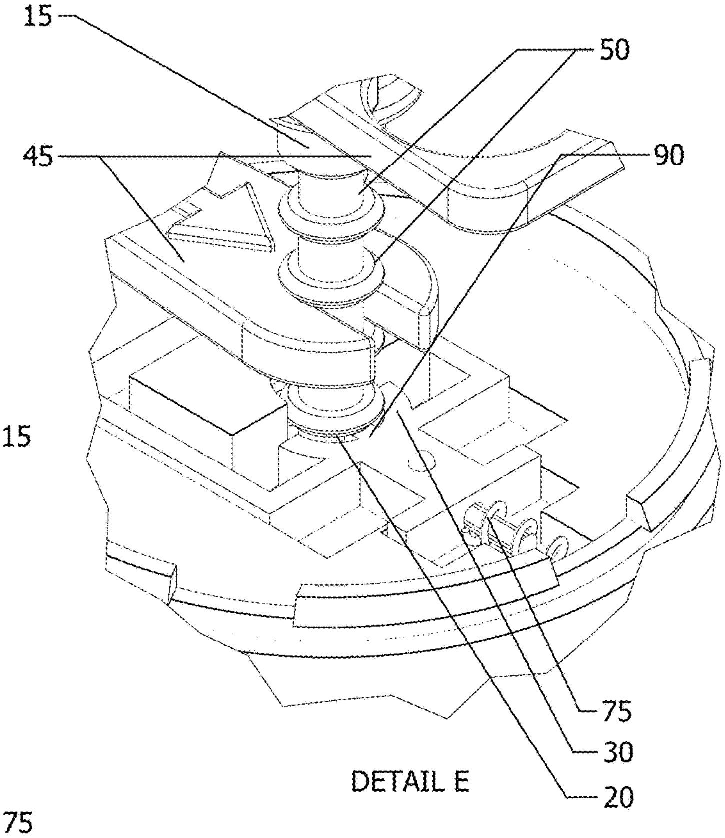
FIG. 4B is a detailed view of the interaction between the plunger profile geometry and the engagement mechanism taken at detail E in FIG. 4A.

The tip of the plunger 80 is inserted into the through-hole 22 of the dropper cap 35 and into the tube 10 such that the plunger profile geometry 50 makes contact with the engagement mechanism 25 as shown in FIGS. 3C, 4A, and 4B. The size and shape of the plunger 15 is suited to accommodate the receiving element 30 of the engagement mechanism 25 as well as the inner diameter of the tube 10. Referring now to FIGS. 4A-4C and 5A-5C, the plunger 15 fits and moves within the engagement mechanism 25 such that it may be advanced within and withdrawn from the tube 10.

Figure 5A:
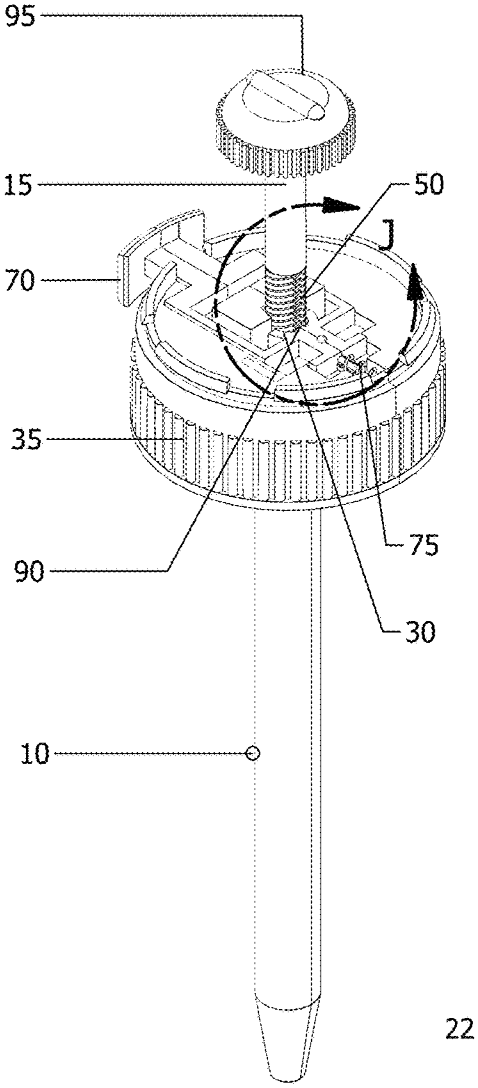
FIG. 5A is a perspective view of the modified dropper assembly having a threaded and channeled plunger profile geometry and a spring-loaded receiving element within the dropper cap.

In instances where the complimentary geometry between the plunger profile 50 and the engagement mechanism 25 allows only for forward motion (or advancement) of the plunger 15 into the tube 10, an optional disengagement mechanism 70 may be introduced. One example of such disengagement mechanism 70 is depicted in FIGS. 4A and 5A. In one embodiment, the disengagement mechanism 70 takes the form of a spring-loaded button connected to the engagement mechanism 25. The user depresses this button 70 to compress the spring 75 within the engagement mechanism 25, thereby retracting the receiving element 30 away from the plunger profile geometry 50 and allowing free movement of the plunger 15 within the tube 10.

Referring now to FIGS. 6A-8B, the interlocking elements 20 of the plunger profile geometry 50 may take the form of flat segments or valleys between intermittent teeth or bell-shaped elements. The interlocking element 20 may alternatively take the form of one or more channels within a threaded plunger. The tip 80 of the plunger 15 may equipped with an o-ring 85 to create a watertight seal between the plunger tip 80 and the interior of the tube 10. Alternatively, a rubber tip 88, may be attached to the end of the plunger tip 80, and sized such that there is a watertight connection between the interior of the tube 10 and the rubber tip 88. Please refer to FIGS. 1A and 8A.

To use the modified dropper device 5, liquid must be present within the tube 10. The user must advance the plunger 15 within the tube and submerge the tube tip 55 into a desired liquid either within a container of liquid or in an optional vial. The user may advance the plunger 15 by stepping through the entire series of intermittent engagements with the interlocking elements 20 or by depressing an optional disengagement mechanism 70. Please refer to FIGS. 1A-1D.

To extract material, the plunger 15 is withdrawn from the hollow tube 10 as the tube tip 55 remains submerged in the liquid. The optional disengagement mechanism 70, described above, may be included within a modified dropper assembly 5 if the specific plunger profile geometry 50 being implement does not permit retraction of the plunger 15. The tight seal between the plunger tip 80 and interior of the tube 10 results in a pressure differential and resulting vacuum within the interior of the tube 10. Liquid is subsequently drawn into the hollow tube 10 as the pressure equalizes. When a sufficient amount of liquid has been extracted from the liquid containment vessel or vial 40, the user places the dispensing end of the tube 10 near the tube tip 55 into the desired administration location and depresses the end of the plunger or knob 95. The application of force to the plunger end advances the interlocking elements 20 on the plunger profile geometry 50 through the receiving element 30 of the engagement mechanism 25. The receiving element 30 recurrently engages with the interlocking elements 20 on the plunger 15 such that a distinct sound and vibration is generated with each unit dose dispensed.

In the embodiments depicted in FIGS. 4A-5C, a spring-loaded receiving element 30 is fitted with a projecting element such as a pin or collar 90 that engages with the varying contours of the plunger profile geometry 50. The spring 75 applies force to the receiving element 30, pushing the pin or collar 90 firmly against the plunger profile geometry 50.

The pin or collar 90 within the receiving element 30 moves over the contours of the plunger profile geometry 50 as it advances within the engagement mechanism 25. Force from the advancing plunger 15 causes the spring 75 to compress and store potential energy. When the pin or collar 90 is propelled into an interlocking element 20 on the plunger profile geometry 50, the stored potential energy within the spring 75 transforms into kinetic energy in the form of noise and vibration. These audible and tactile cues signal the administration of a unit dose. As the user continues to apply force to the plunger 15, this force is transferred to the pin or collar 90. The spring-loaded nature of the receiving element 30 allows the pin or collar 90 to advance and retract to follow the contours of the plunger profile geometry 50. The engagement mechanism 25 thereby periodically "clicks" as the receiving element 30 engages with each interlocking element 20. See FIG. 5C. Alternatively a pliable receiving element 30 such as an elastic pin or collar 90 may be used such that the receiving element 30 deforms when compressed and then springs back to its original shape, releasing sound and vibration when the pin 90 engages with an interlocking element 20. See FIG. 3D. In another embodiment depicted in FIG. 3E, a pliable engagement element engages and disengages with a set rigid or semi-rigid plunger stops such as that depicted in FIGS. 9A and 9B. It should be recognized that this configuration could be reversed, implementing a flexible set of plunger stops in conjunction with a rigid or semi-rigid engagement mechanism as shown in FIGS. 3D, 3E, 9A and 9B. Figures have been shown without the protective cover for clarity; however, the dropper cap 35 will ideally be fitted with a dropper cap cover 105, as illustrated in FIG. 5D, to protect and house the components within the engagement mechanism 25.

Figure 4C:
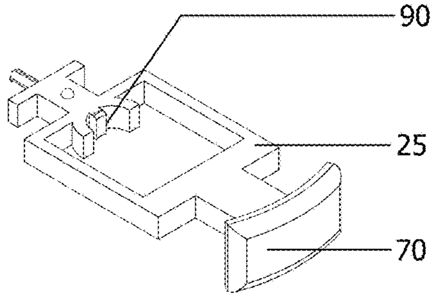
FIG. 4C is a perspective view of the receiving element, illustrating the pin/collar and spring guide.
Figure 8A:
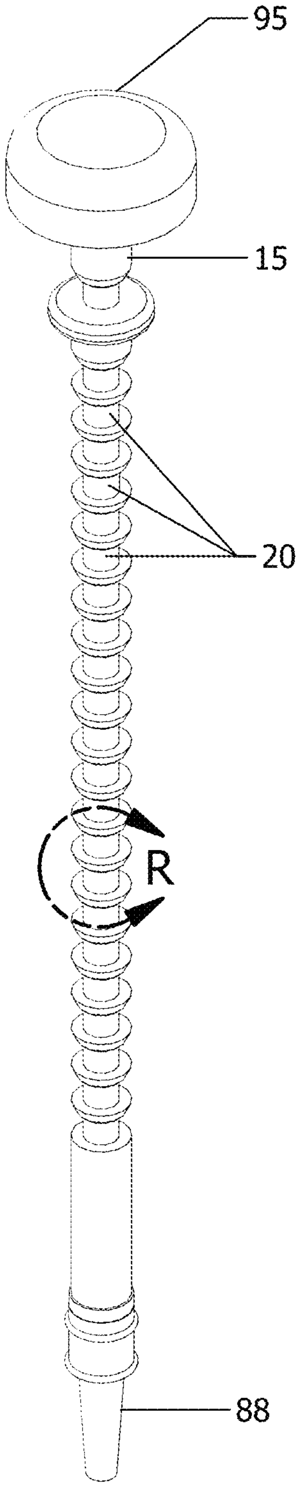
FIG. 8A is a perspective view of one embodiment of the plunger profile geometry incorporating a series of bell-shaped stops.
Figure 8B:
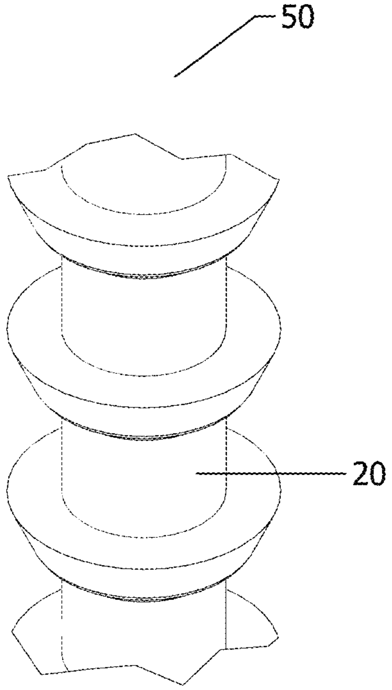
FIG. 8B is a detailed view of the plunger stops taken at detail R in FIG. 8A.
Figure 9A:
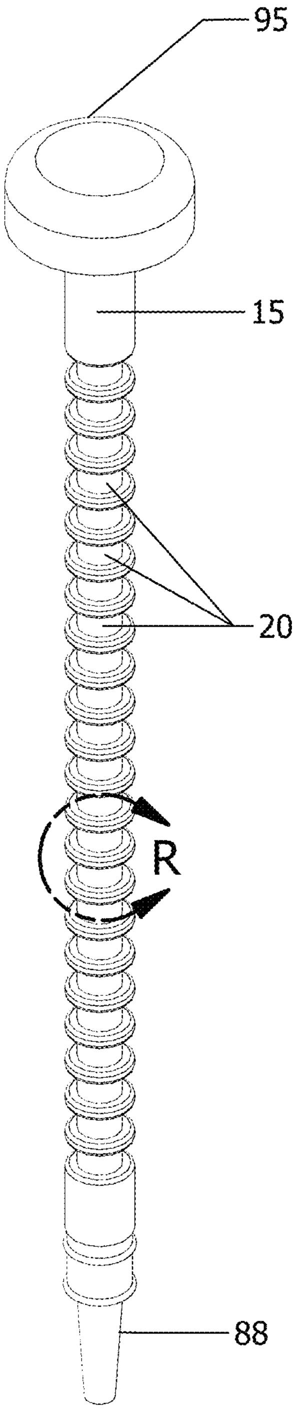
FIG. 9A is a perspective view of another embodiment of the plunger profile geometry incorporating a series of chamfered stops that mate with a flexible receiving element such as that depicted in FIG. 3E.
Figure 9B:
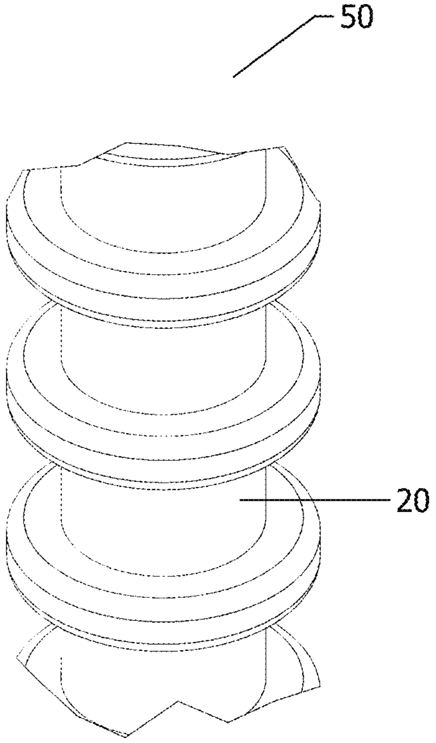
FIG. 9B is a detailed view of the plunger stops taken at detail R in FIG. 9A.

FIGS. 4A-4B, illustrates one embodiment wherein teeth or stops within the plunger profile geometry 50 are used to compress the spring 75. The pin or collar 90 emits a noise and sensation as it moves from each tooth and "clicks" into the adjacent flat segment or valley (interlocking element 20) on the plunger profile geometry 50. The shape of the stops or teeth may take any number of forms including but not limited to the bell-shaped profile depicted in FIGS. 8A and 8B, provided that the pin or collar 90 emits an audible and tactile signal to the user as it engages with each interlocking element 20. A more in-depth view of one embodiment of the receiving element 30 and pin 90 is shown in FIG. 4C.

Each "unit dose" is determined by the distance between the interlocking elements 20 in the profile. Plunger profile geometries 50 will vary and may be customized depending on the potency of the material being administered. The distance between the interlocking elements 20 will be shorter for more potent medications and longer for medications having reduced potency.

Figure 5B:
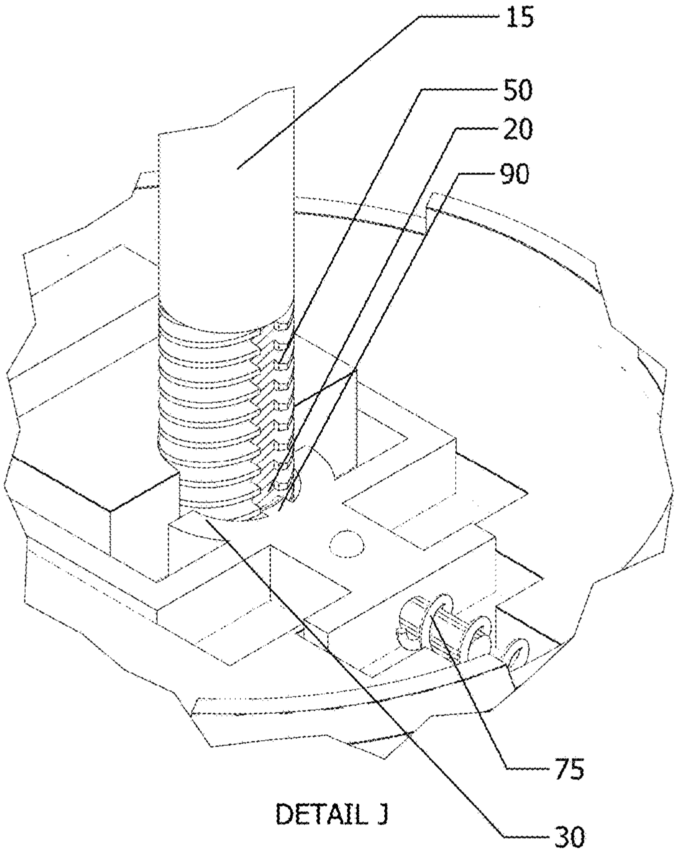
FIG. 5B is a detailed view of the interaction between the plunger profile geometry and the engagement mechanism taken at detail J in FIG. 5A.
Figure 5C:
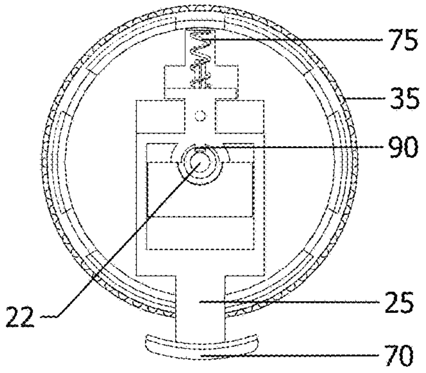
FIG. 5C is a top view of the dropper cap without the dropper cap cover, illustrating one embodiment of the receiving element and pin within the engagement mechanism.
Figure 5D:
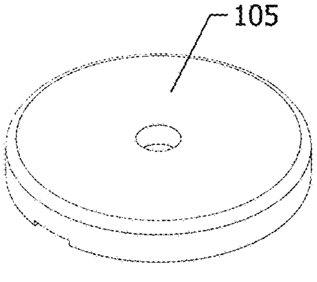
FIG. 5D is a perspective view of the dropper cap cover placed on the dropper cap to shield the engagement mechanism.
Figure 6A:
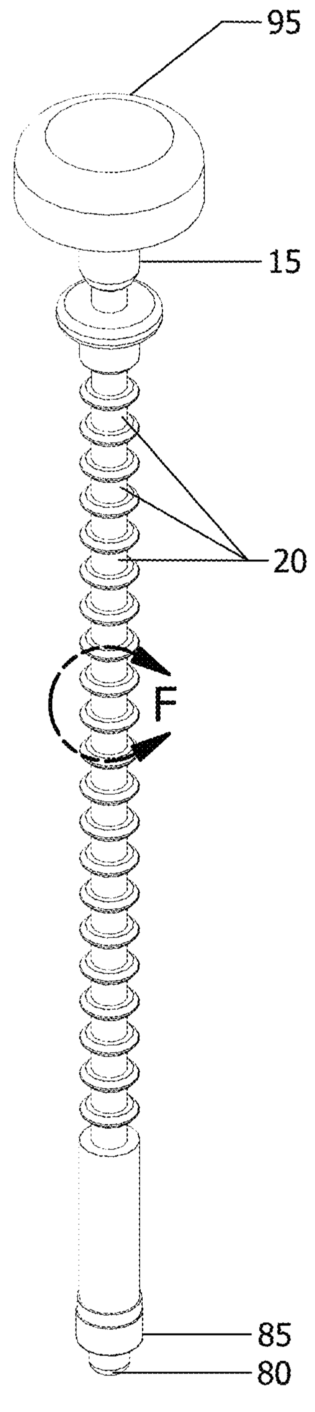
FIG. 6A is a perspective view of one embodiment of the plunger profile geometry incorporating a series of teeth or plungers.
Figure 6B:
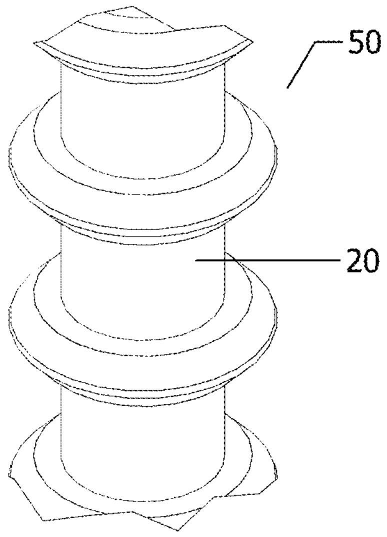
FIG. 6B is a detailed view of the teeth/plungers taken at detail F in FIG. 6A.
Figure 7A:
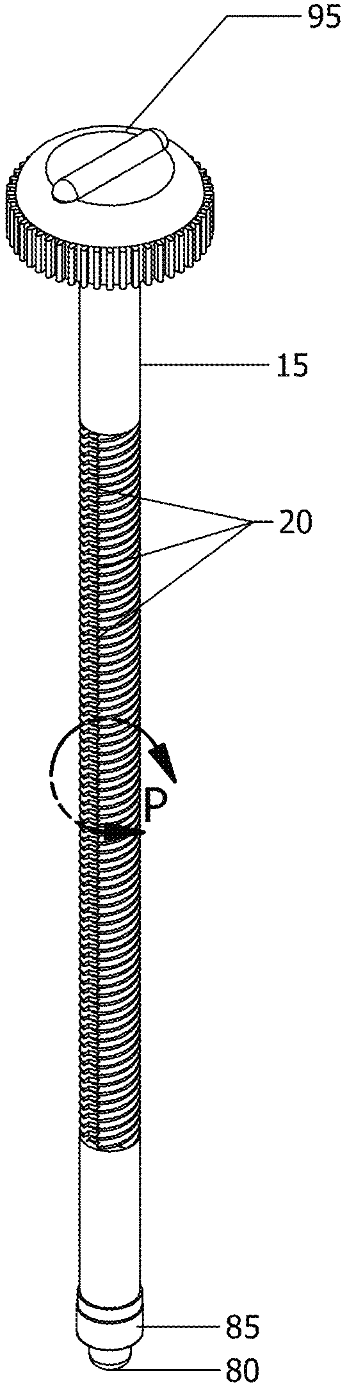
FIG. 7A is a perspective view of one embodiment of the plunger profile geometry incorporating a channel within threads and positioned along the longitudinal axis of the plunger.
Figure 7B:
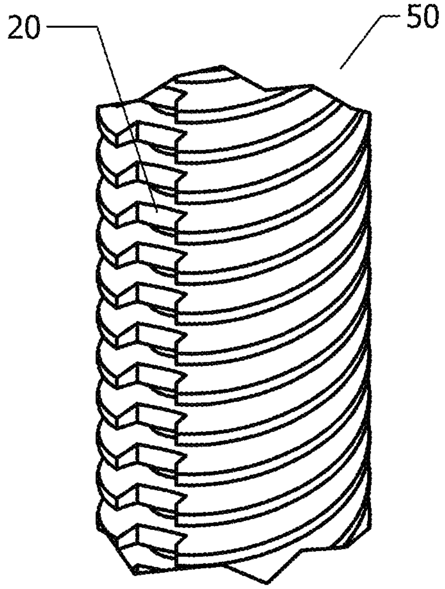
FIG. 7B is a detailed view of one plunger channel and threads taken at detail P in FIG. 7A.

FIGS. 5A-5C illustrate another embodiment wherein the plunger profile geometry 50 includes threads and additionally includes at least one slot or channel along the length of the longitudinal axis L-L of the plunger 15. The plunger 15 may be equipped with a knob 95 at the proximal end of the plunger 15 which may be knurled to improve grip on the unit 5. Referential marks may also be placed on this knob 95 as shown in FIGS. 5A and 7A to provide additional visual cues to the user as to the rotational position of the knob 95. Rotation of this knob 95 forces the pin to follow the contour of the thread until it engages with the channel (interlocking element 20), creating a click and vibration as described above. Additional force applied by the user allows the pin 90 to leave the channel and continue along the threads periodically "clicking" as it drops within the channel with each unit dose. Like the embodiment described above, the number of channels within the plunger profile can be customized to accommodate the potency of the liquid being administered. This embodiment is particularly useful when very precise dosing is required as multiple channels may be introduced about the exterior of the plunger 15 and parallel to it longitudinal axis L-L.

It should be appreciated that any number of plunger profile geometries 50 may be used to achieve the communication of each unit dose provided that the profile 50 provides peaks to store potential energy and flat segments or discrete valleys in which a noise and vibration is emitted. These profiles may be used with or without threads.

It should also be understood that the receiving element 30 may be elastic in nature and may take the form of a deformable spring or tab, eliminating the need for a separate spring 75. It should be further appreciated that the plunger 15 may include an elastic element or protrusion that recurrently snaps into corresponding complimentary geometries within the engagement mechanism 25.

Ideally, the interaction between the engagement mechanism 25 and plunger profile geometry allows for stepped motion of the plunger 15 both as it is withdrawn and extended; however, there may be some instances where it is preferable to lock the plunger 15 in place to prevent inadvertent retraction. In such a case, the connection between the engagement mechanism 25 and interlocking elements 20 may be designed to facilitate advancement of the plunger 15 only. In such a case, the disengagement mechanism 70, as described above, may be included to disengage the plunger 15 from the receiving element 30.

Figure 1B:
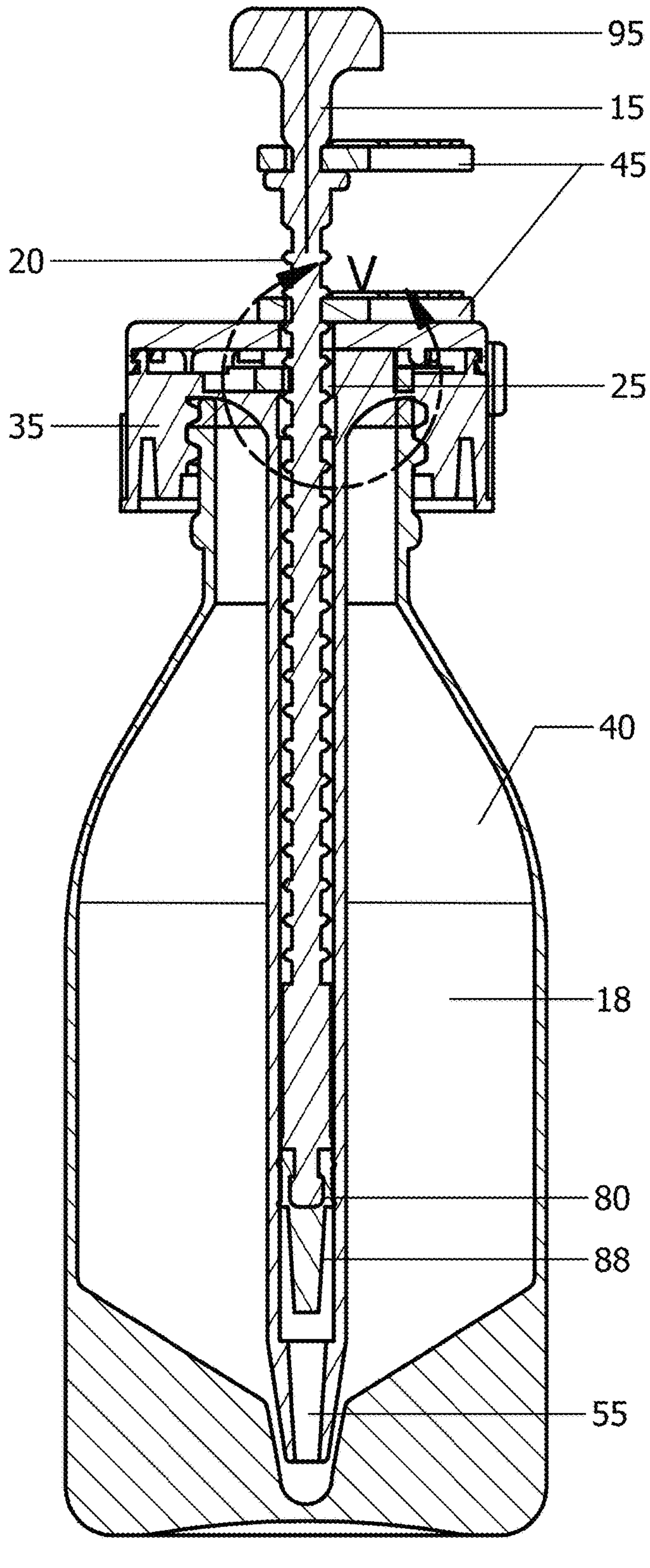
FIG. 1B is a cross-sectional view of the modified dropper assembly secured to an optional vial illustrating the rubber tip attached to the plunger tip.
Figure 1C:
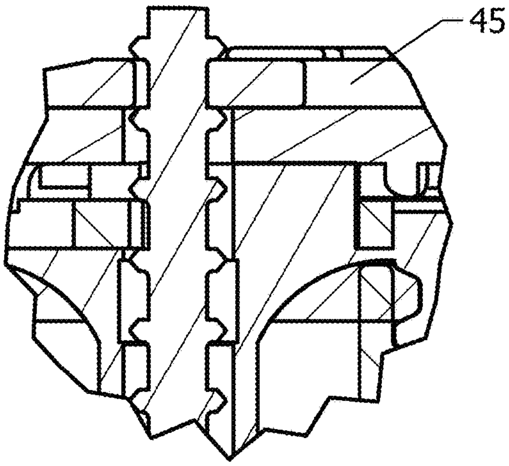
FIG. 1C is a detailed view of the interaction between the engagement mechanism and interlocking elements of the plunger profile taken at detail V in FIG. 1B.
Figure 1D:
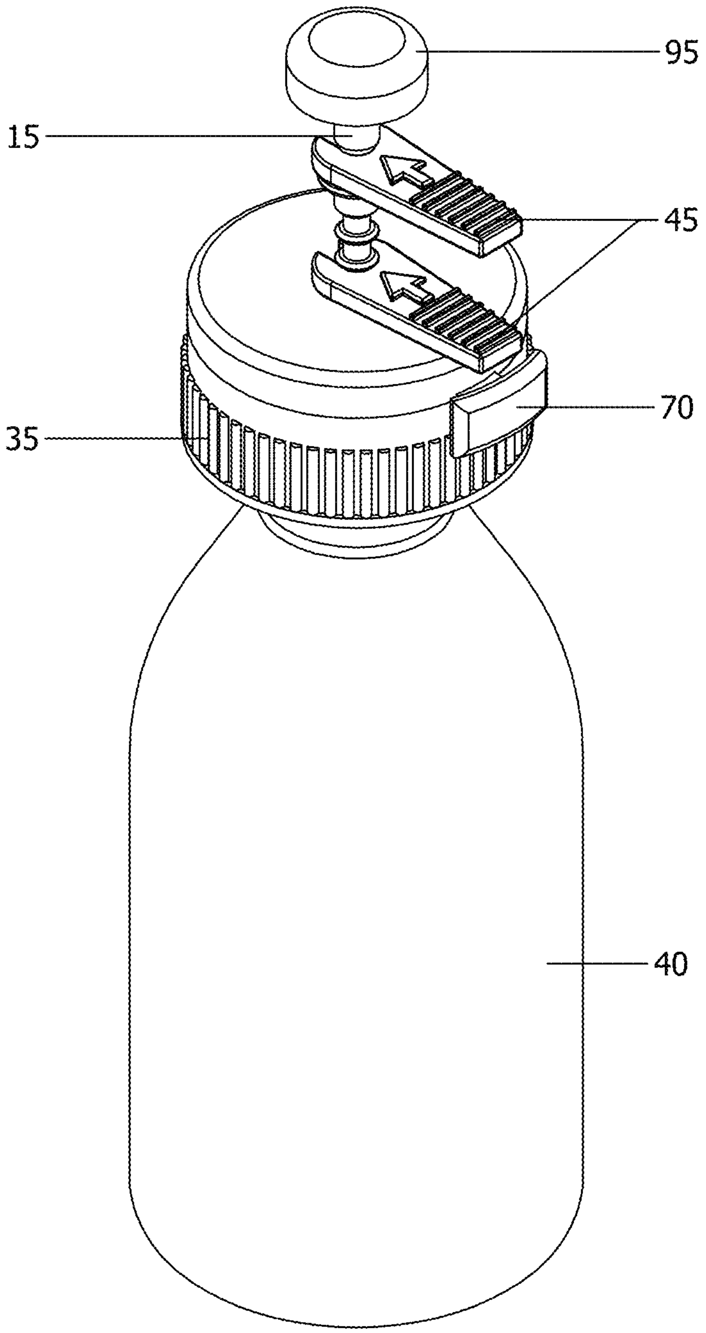
FIG. 1D is a perspective view of the modified dropper assembly secured to the optional vial and having two optional dose limiting keys.
Figure 2A:
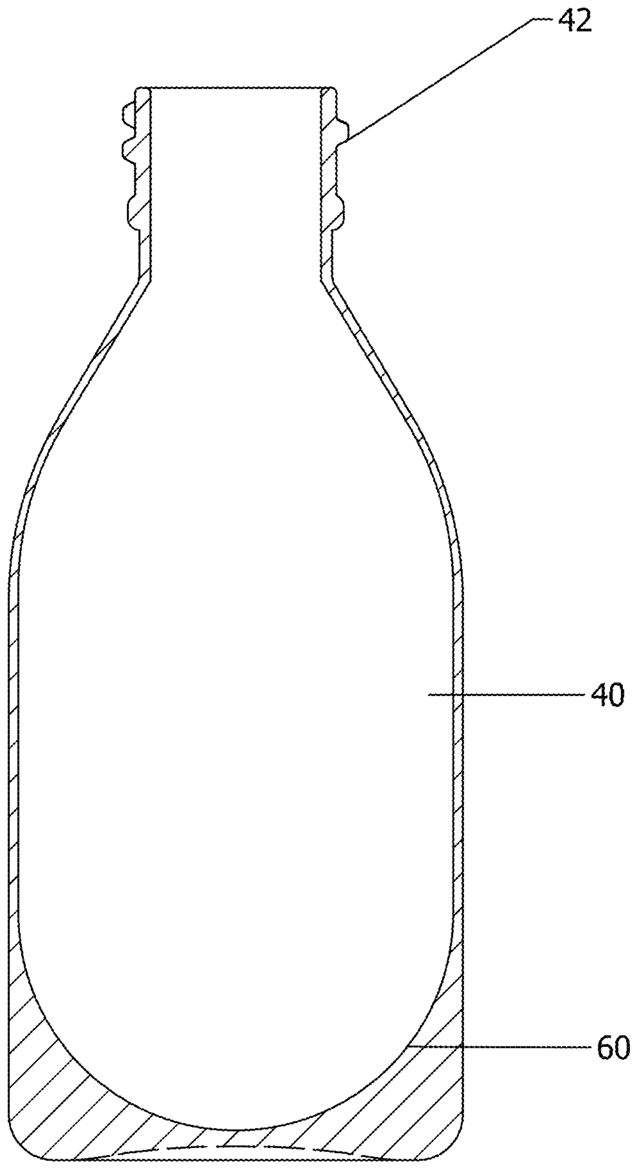
FIG. 2A is a cross-sectional side view of an optional vial having a curved base and threaded connection.
Figure 2B:
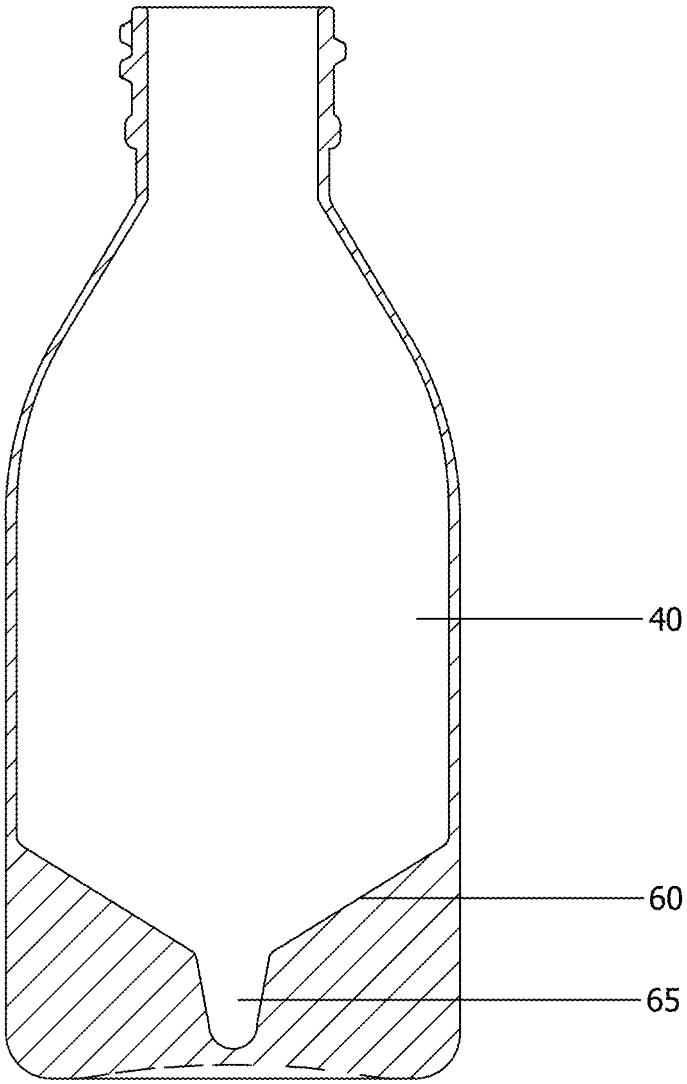
FIG. 2B is a cross-sectional side view of an optional vial having a funnel shaped base and unthreaded connection.

Referring now to FIGS. 1A, 1B, 1D, 4A, and 4B, one or more optional dosing keys 45 may be used in conjunction with the plunger 15 to improve the safety of administration. Use of multiple dosing keys 45 may also help in tracking daily dosing as depicted in FIG. 1C. These dosing keys 45 may be labeled with specific hours or days or may be color coded or labeled to suit the needs of the user. Labeling may be printed or molded into the dosing keys 45 to provide additional tactile feedback for those with reduced visual acuity. To use the dosing key 45, the person administering the material counts the number of unit doses corresponding to the number of interlocking elements 20 on the plunger profile geometry 50 through visualization or alternatively by touch. The dosing key 45 is then placed about or within the interlocking element 20 corresponding to the desired unit dose. For instance, if the user wishes to administer two unit doses, the user must place the dosing key 45 in the interlocking element 20, two protrusions above the engagement mechanism 25. The user would then apply pressure to the knob end of the plunger 15 to administer the liquid in the desired dose. The motion of the plunger 15 is impeded when the dosing key 45 makes contact with the top of the dropper cap 35 as shown in FIGS. 1A-1C. The dosing key 45 operates as a physical limiter, signaling to the user that the required quantity of material has been administered.

If desired, a watertight seal between the dropper cap 35 and optional vial 40 may be achieved through use of a gasket 110 or similar sealing device. Alternatively, tightly fitting and complimentary vial threads 42 and dropper cap threads 38 as shown in FIGS. 2A and 3A may be used alone or in combination with a gasket 110. In yet another embodiment, the watertight seal may be accomplished through a secure press fit between the dropper cap 35 and vial 40 as in the configuration shown in FIG. 3B shown with an optional gasket 110. It should be understood that any standard connection means may be used between the dropper cap 35 and vial 40 provided that a watertight seal is created between these two components.

Inventors anticipate that the components described herein will be manufactured from durable autoclavable plastics such as polypropylene and polyethylene; however it should be recognized that any suitable material may be used.

While the above description contains many specifics, these should be considered exemplifications of one or more embodiments rather than limitations on the scope of the invention. As previously discussed, many variations are possible and the scope of the invention should not be restricted by the examples illustrated herein.

The invention claimed is:

1. An apparatus for metering and communicating a quantity of material dispensed from a dropper, the apparatus comprising:

a cap comprising a through-hole and a base;

an engagement mechanism configured to abut said through-hole and positioned within or forming an integral part of the cap;

a hollow tube having an interior adapted to contain a liquid, a longitudinal axis, a connection end mechanically affixed to or forming an integral part of the cap, and a dispensing end adapted to deliver the liquid;

wherein the longitudinal axis of said hollow tube is configured to be centered beneath the through-hole at the base of the cap;

wherein the connection end is configured to fully surround said through-hole at the base of the cap;

a plunger comprising an exterior and a longitudinal axis, said plunger configured to be inserted into and moveable within said through-hole and said hollow tube, the exterior of said plunger comprising:

a sealing portion along a first segment of the plunger exterior adapted to form a watertight seal between said sealing portion of the plunger and the interior of the hollow tube;

a plunger profile geometry along a second segment of the plunger exterior wherein said plunger profile geometry corresponds to a plurality of discrete doses of liquid;

at least one dosing key configured to be removably attached to the plunger profile geometry such that the motion of the plunger is configured to be restricted when said dosing key makes contact with the cap;

wherein said engagement mechanism is configured to engage with the plunger profile geometry as the plunger advances within the hollow tube in a manner that provides visual, audible, and tactile feedback with each dispensed discrete dose; and wherein the sealing portion of said plunger is configured to cause liquid within said hollow tube to advance from the dispensing end of said hollow tube.

2. The apparatus of claim 1 wherein the engagement mechanism is comprised of a spring-loaded projecting receiving element;

wherein the plunger profile geometry is comprised of a series of uniformly spaced peaks and interlocking elements such that the spacing between each interlocking element corresponds to a desired dose of liquid; and wherein the spring-loaded projecting receiving element is configured to engage with the plunger profile geometry as the plunger advances within the hollow tube, such that an engagement with said interlocking elements creates visual, audible, and tactile feedback with each administered dose.

3. The apparatus of claim 1 wherein the engagement mechanism is comprised of a spring-loaded projecting receiving element;

wherein the plunger profile geometry is comprised of one channel parallel to said longitudinal axis of said plunger; and wherein the plunger profile geometry is further comprised of a set of contiguous threads having a uniform pitch about said plunger exterior such that the pitch of the threads and the position of the channels corresponds to a desired dose of liquid; and wherein the spring-loaded projecting receiving element is configured to periodically engage with said channel as the receiving element travels within said threads, said periodic engagement is configured to create visual, audible, and tactile feedback with each administered dose.

4. The apparatus of claim 1 wherein the engagement mechanism is comprised of a spring-loaded projecting receiving element;

wherein the plunger profile geometry is comprised of two or more channels equidistantly spaced about the plunger exterior and positioned parallel to the longitudinal axis of said plunger;

wherein the plunger profile further comprises a set of contiguous threads having a uniform pitch about said plunger exterior;

wherein the pitch of the threads and the position of the channels corresponds to a desired micro dose of liquid; and wherein the spring-loaded projecting receiving element is configured to periodically engage with said channel as it travels within said threads, such that said periodic engagement is configured to create visual, audible, and tactile feedback with each administered dose.

5. The apparatus of claim 1 wherein the engagement mechanism is comprised of a pliable projecting receiving element;

wherein the plunger profile geometry is comprised of a series of uniformly spaced peaks and interlocking elements such that the spacing between each interlocking element corresponds to a desired dose of liquid; and wherein the pliable projecting receiving element is configured to engage and disengage with the plunger profile geometry as the plunger advances within the hollow tube, such that an engagement with said interlocking elements is configured to create visual, audible, and tactile feedback with each administered dose.

6. The apparatus of claim 1 wherein the engagement mechanism is comprised of a pliable projecting receiving element;

wherein the plunger profile geometry is comprised of one channel parallel to said longitudinal axis of said plunger; and wherein the plunger profile geometry is further comprised of a set of contiguous threads having a uniform pitch about said plunger exterior such that the pitch of the threads and the position of the channels corresponds to a desired dose of liquid; and wherein the pliable projecting receiving element is configured to periodically engage and disengage with said channel as it travels within said threads, such that a periodic engagement is configured to create visual, audible, and tactile feedback with each administered dose.

7. The apparatus of claim 1 wherein the engagement mechanism is comprised of a pliable projecting receiving element;

wherein the plunger profile geometry is comprised of two or more channels equidistantly spaced about the plunger exterior and positioned parallel to the longitudinal axis of said plunger;

wherein the plunger profile further comprises a set of contiguous threads having a uniform pitch about said plunger exterior;

wherein the pitch of the threads and the position of the channels corresponds to a desired micro dose of liquid; and wherein the pliable projecting receiving element is configured to periodically engage and disengage with said channel as it travels within said threads, such that a periodic engagement is configured to create visual, audible, and tactile feedback with each administered dose.

8. The apparatus of claim 1 wherein the engagement element is molded within the cap.

9. The apparatus of claim 1 wherein the engagement mechanism further comprises a disengagement mechanism that is configured to uncouple the engagement mechanism from the plunger profile thereby allowing the plunger to be withdrawn from the hollow tube quickly.

10. The apparatus of claim 1 wherein the plunger further comprises a knurled knob.

11. The apparatus of claim 1 wherein the plunger further comprises a knurled knob with a visual indicator.

12. The apparatus of claim 1 wherein the at least one dosing key is color-coded.

13. The apparatus of claim 1 wherein the at least one dosing key comprises a label.

14. The apparatus of claim 1 wherein the dispensing end of the hollow tube is tapered.

15. The apparatus of claim 1 wherein the cap is adapted to fit on a vial such that a watertight seal is formed, the vial comprising a concave base.

16. The apparatus of claim 1 wherein the cap is adapted to fit on a vial such that a watertight seal is formed, the vial comprising a funnel-shaped base.

17. The apparatus of claim 1 wherein the cap further comprises a protective cover.

18. A method for metering and visually, audibly, and tactilely communicating a quantity of liquid dispensed from a dropper, the method of comprising the steps of:

(a) Selecting a desired dose of liquid to be dispensed by the dropper;

(b) Selecting a hollow tube comprising an interior and filled with the desired liquid, wherein said hollow tube is fitted with an engagement mechanism within or about said hollow tube;

(c) Selecting a plunger comprised of an exterior and a longitudinal axis that slidably seats within said hollow tube such that a watertight seal is formed between a first segment of the exterior of said plunger and the interior of said hollow tube plunger;

(d) Forming a plunger profile geometry on a second segment of the exterior of said plunger and parallel to said longitudinal axis, wherein said plunger profile geometry is comprised of a series of uniformly spaced peaks and interlocking elements, and wherein the spacing between each adjacent interlocking element corresponds to the selected dose of liquid;

(e) Placing the plunger within the hollow tube;

(f) Advancing the plunger within the hollow tube such that the engagement element recurrently engages and disengages with the interlocking elements in a manner that provides visual, audible, and tactile cues with each unit dose dispensed; and (g) Removably attaching at least one dosing key to the plunger profile geometry such that the motion of the plunger is restricted when said dosing key makes contact with the cap.

19. A method for metering and visually, audibly, and tactilely communicating a quantity of liquid dispensed from a dropper, the method of comprising the steps of:

(a) Selecting a desired dose of liquid to be dispensed by the dropper;

(b) Selecting a hollow tube comprising an interior and filled with the desired liquid, wherein said hollow tube is fitted with an engagement mechanism within or about said hollow tube;

(c) Selecting a plunger comprised of an exterior and a longitudinal axis that slidably seats within said hollow tube such that a watertight seal is formed between a first segment of the exterior of said plunger and the interior of said hollow tube plunger;

(d) Forming a plunger profile geometry on a second segment of the exterior of said plunger, wherein the plunger profile geometry is comprised of at least one channel parallel to the longitudinal axis of said plunger and a further comprises set of contiguous threads having a uniform pitch about said plunger exterior such that the pitch of the threads and the position of the channel or channels corresponds to a desired dose of liquid;

(e) Placing the plunger within the hollow tube;

(f) Advancing the plunger within the hollow tube such that the engagement element recurrently engages and disengages with each channel in a manner that provides visual, audible, and tactile cues with each unit dose dispensed; and (g) Removably attaching at least one dosing key to the plunger profile geometry such that the motion of the plunger is restricted when said dosing key makes contact with the cap.

* * * * *